Nov. 4, 1924.
B. H. YATES
1,513,781
COATED FOOD MOLDER
Filed Jan. 15, 1923         2 Sheets-Sheet 2
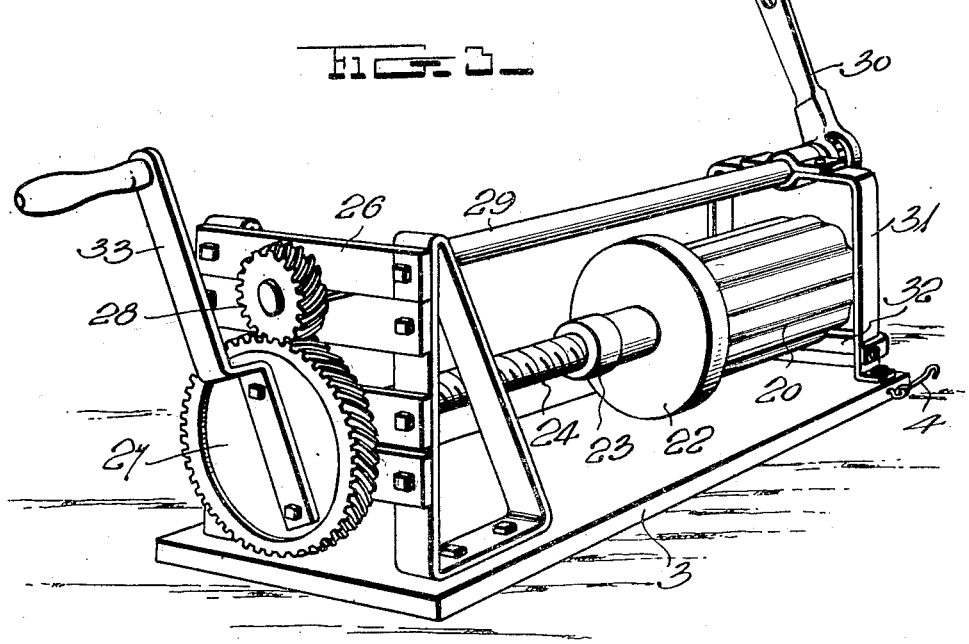
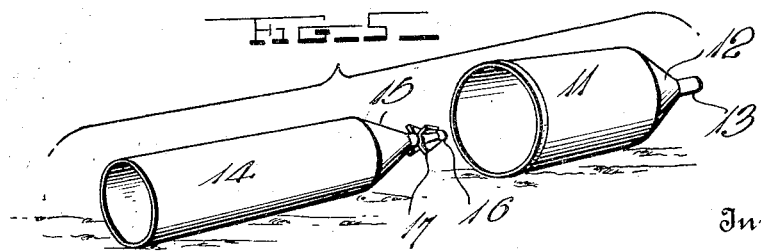
Witness
H. Woodard
Inventor
B. H. YATES
By H. B. Willson & Co.
Attorneys Patented Nov. 4, 1924.

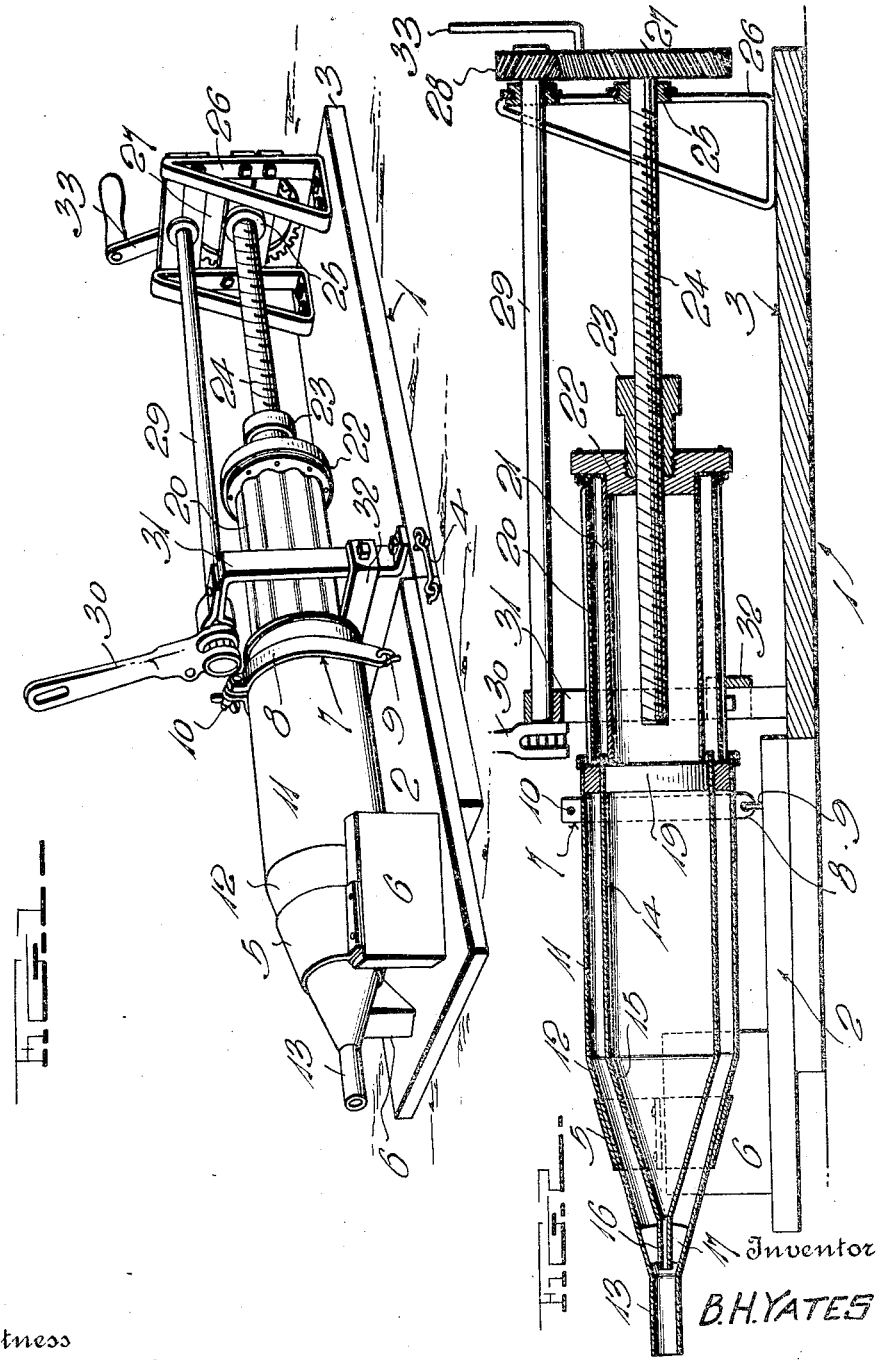

1,513,781

UNITED STATES PATENT OFFICE.

BENJAMIN H. YATES, OF WEBB CITY, MISSOURI.

COATED-FOOD MOLDER.

Application filed January 15, 1923. Serial No. 612,840.

*To all whom it may concern:*

Be it known that I, BENJAMIN H. YATES, a citizen of the United States, residing at Webb City, in the county of Jasper and State of Missouri, have invented certain new and useful Improvements in Coated-Food Molders; and I do declare the following to be a full, clear, and exact description of the invention, such as will enable others skilled in the art to which it appertains to make and use the same.

My invention has for its principal object to provide a simple and inexpensive, yet a highly efficient and desirable device for moulding foods having a core and a coating around the same.

In carrying out the above end, a further object is to provide a moulding device including a plurality of cylinders disposed one within another and all open at one end to permit the discharge of their contents. Thus, the different cylinders may be filled with different food compositions in a more or less plastic state to be simultaneously extruded from the cylinders, thus simultaneously forming a core and a coating around the same.

A still further object is to provide novel operating means for the plungers which are used for discharging the contents of the different cylinders.

Yet another object is to make novel provision whereby all parts which need frequent cleaning, may be readily disassembled.

With the foregoing in view, the invention resides in the novel subject matter hereinafter described and claimed, the description being supplemented by the accompanying drawings.

Figure 1 is a perspective view of a food molder constructed in accordance with my invention.

Figure 2 is a central vertical longitudinal section.

Figure 3 is a perspective view of the plunger operating means.

Figure 4 is a perspective showing the means for removably clamping the cylinders upon the base.

Figure 5 is a perspective view illustrating the two cylinders of the present machine, in juxtapositions.

In the drawings above briefly described, the numeral 1 designates an appropriate base which is preferably formed of two sections 2 and 3 detachably connected with each other by any preferred means, such as hooks 4. The section 2 is provided with a fixed tapered collar 5 which may well be mounted on a pair of blocks 6 secured to the upper side of said section near its outer end. At its other end, the base section 2 is provided with a cylinder clamp 7 which preferably consists of two curved arms 8 pivoted at 9 to said base section and held together at their upper ends by a thumb screw or the like 10.

An outer cylinder 11 is held at its rear end by the clamp 7 and is provided with a funnel-shaped front end 12 which is snugly received in the collar 5, said end 12 terminating in a discharge nipple 13. Within and spaced from the outer cylinder 11, is an inner cylinder 14 having a funnel-shaped front end 15 provided with a discharge nipple 16 which preferably terminates in slightly spaced relation to the inner end of the nipple 13, radial webs 17 being provided to center the cylinder 14 within the outer cylinder 11. In the present showing, these webs are carried by the nipple 16.

By the arrangement of cylinders described, it will be seen that they may be filled with different food compositions in substantially a plastic form, so that when the contents of said cylinders are exuded through their nipples 13 and 16, a stuffed food product will result, the device being well adapted for making hot tamales.

For discharging the contents of the outer cylinder 11 and holding the body portion of the cylinder 14 centered therein, I provide an outer annular plunger 18, while a plunger 19 of any desired form fits within the inner cylinder 14. For the purpose of forcing the two plungers forwardly, I have shown outer and inner tubular members 20 and 21 respectively, the member 20 engaging the plunger 18 while the inner member 21 contacts with the plunger 19. The plungers may be either attached to or separate from the tubular members 20 and 21 as occasion may require but I prefer that they shall be separate parts, in order that they may be readily cleaned and sterilized when necessary. The tubular members 20 and 21 are secured to and extend forwardly from a head 22 having a suitable hub 23 through which a longitudinal operating screw 24 is threaded, a portion of this screw being receivable within the member 21 as shown clearly in Fig. 2. This screw 24 is rotatably mounted at 25 upon a transverse end frame 26 which rises from the outer end of the base section 3 and for operating this screw by power, I have shown a gear wheel 27 thereon meshing with a pinion 28 on a longitudinal operating shaft 29, this shaft being provided with a ratchet handle 30 adjacent the cylinders 11 and 14. A suitable bearing for one end of the shaft 29 is provided on the frame 26 while another end frame 31 at the opposite end of the base section 3 carries another bearing for said shaft, said frame 31 being also provided with a transverse bar 32 upon which the outer tubular member 20 may be slidably supported.

By the arrangement above described, it will be seen that oscillation of the handle 30 will slowly operate the plungers 18 and 19 with power to extrude the contents of the cylinders 11 and 14. In order that the head 22 and parts carried thereby however may be more rapidly returned, I prefer to equip the gear wheel 27 with a crank 33. After this crank has been rotated to withdraw the tubular members 20 and 21 from the cylinders 11 and 14, the clamp 7 may be released and the two cylinders bodily removed from the base section 2. Then the inner cylinder may be withdrawn from the outer cylinder, so that they can both be easily cleaned. The cleaning operation of the entire device is greatly facilitated by having the base sections 1 and 2 releasable from engagement with each other so that if desired, the base section 2 may be detached from the other section which carries the operating means, before the cylinders are removed and it will be seen that if the plungers 18 and 19 are separate from the tubular members 20 and 21, they will remain within their respective cylinders until the latter are disassembled with respect to each other.

Excellent results have been obtained from the details disclosed and I therefore prefer to follow these details. It is to be understood however that within the scope of the invention as claimed, numerous minor changes may be made.

I claim:

A device of the class described comprising a base, a cylinder mounted horizontally upon said base and extending longitudinally of the same, a screw rotatably mounted horizontally upon said base and extending longitudinally of the same, said screw being disposed substantially in axial alinement with said cylinder, a plunger in said cylinder operated by said screw, a shaft mounted horizontally upon said base and extending longitudinally of the same parallel to said screw, one end of said shaft being disposed adjacent one end of said cylinder, handled ratchet means disposed on said end of said shaft for operating the same step by step, reduction gearing connecting the other end of said shaft and the adjacent end of said screw to drive the latter from said shaft, said gearing including a gear wheel on said screw, and a handle on said wheel whereby the latter may be rapidly operated to rapidly withdraw said screw.

In testimony whereof I have hereunto affixed my signature.

BENJAMIN H. YATES.